US006398187B1

(12) United States Patent
Chang

(10) Patent No.: US 6,398,187 B1
(45) Date of Patent: Jun. 4, 2002

(54) JACK

(76) Inventor: Lee-Cheng Chang, 9F-2, No. 31, Lane 238, Si Ping Road, Taichung (TW)

( * ) Notice: Subject to any disclaimer, the term of this patent is extended or adjusted under 35 U.S.C. 154(b) by 0 days.

(21) Appl. No.: 09/761,522

(22) Filed: Jan. 16, 2001

(51) Int. Cl.[7] .................................................. B60P 1/49
(52) U.S. Cl. ...................................................... 254/8 B
(58) Field of Search ................................ 254/8 B, 2 B, 254/1, DIG. 1, DIG. 3, DIG. 4, 93 R, 93 H

(56) References Cited

U.S. PATENT DOCUMENTS

| | | | | |
|---|---|---|---|---|
| 5,878,996 A | * | 3/1999 | Loan | 254/8 B |
| 5,984,270 A | * | 11/1999 | Hussaini et al. | 254/8 B |
| 6,264,169 B1 | * | 7/2001 | Hung | 254/8 B |

* cited by examiner

*Primary Examiner*—Robert C. Watson
(74) *Attorney, Agent, or Firm*—Alan Kamrath; Rider, Bennett, Egan & Arundel, LLP

(57) ABSTRACT

A jack comprises a frame, a base including an end pivotally mounted to the frame and an engaging portion, an elevating member securely attached to the other end of the base, and a cylinder device including an end pivotally connected to the frame. The cylinder device includes a cylinder and a piston rod having a first end slidably received in the cylinder and a second end beyond the cylinder. The second end of the piston rod is connected to the base to move therewith. When an end of an operative rod is engaged with the engaging portion of the base, the elevating member is quickly elevated when another end of the operative rod is applied with a force. When the operative rod is engaged with the cylinder device, the elevating member is elevated under manual operation on the operative rod.

3 Claims, 6 Drawing Sheets

JACK

BACKGROUND OF THE INVENTION

1. Field of the Invention

The present invention relates to a jack which has an elevating member that can be quickly moved to an underside of an object, e.g., a car chassis, to be elevated.

2. Description of the Related Art

A jack generally includes an elevating member for elevating objects, e.g., the chassis of a car for repair purpose. However, it takes time for the user to operate an operative arm for moving the elevating member of a conventional jack to an underside of, e.g., the car chassis.

The present invention is intended to provide an improved jack that mitigates and/or obviates the above problem.

SUMMARY OF THE INVENTION

A jack in accordance with the present invention comprises:

a frame;

a base including a first end pivotally mounted to the frame and a second end, the base further including an engaging portion;

an elevating member securely attached to the second end of the base;

a cylinder means including an end pivotally connected to the frame, the cylinder means including a cylinder and a piston rod having a first end slidably received in the cylinder and a second end beyond the cylinder, the second end of the piston rod being connected to the base to move therewith; and an operative rod releasably engageable with one of the engaging portion of the base and the cylinder means;

wherein when an end of the operative rod is engaged with the engaging portion of the base, the elevating member is quickly elevated when another end of the operative rod is applied with a force; and wherein when the operative rod is engaged with the cylinder means, the elevating member is elevated under manual operation on the operative rod.

In accordance with a preferred embodiment of the invention, a jack comprises:

a frame including a pair of spaced plates each having a first end, a second end, and an intermediate portion;

a base including a first end pivotally mounted between the intermediate portions of the plates of the frame and a second end located between the first ends of the plates, the base further including an engaging portion;

an elevating member securely attached to the second end of the base;

a cylinder means including an end pivotally connected between the second ends of the plates of the frame, the cylinder means including a cylinder and a piston rod having a first end slidably received in the cylinder and a second end beyond the cylinder, the second end of the piston rod being connected to the base to move therewith; and an operative rod releasably engageable with one of the engaging portion of the base and the cylinder means;

wherein when an end of the operative rod is engaged with the engaging portion of the base, the elevating member is quickly elevated when another end of the operative rod is applied with a force; and wherein when the operative rod is engaged with the cylinder means, the elevating member is elevated under manual operation on the operative rod.

A pair of links is mounted between the plates. Each link has a first end connected with the elevating member and a second end that is pivotally connected to an associated plate of the frame.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
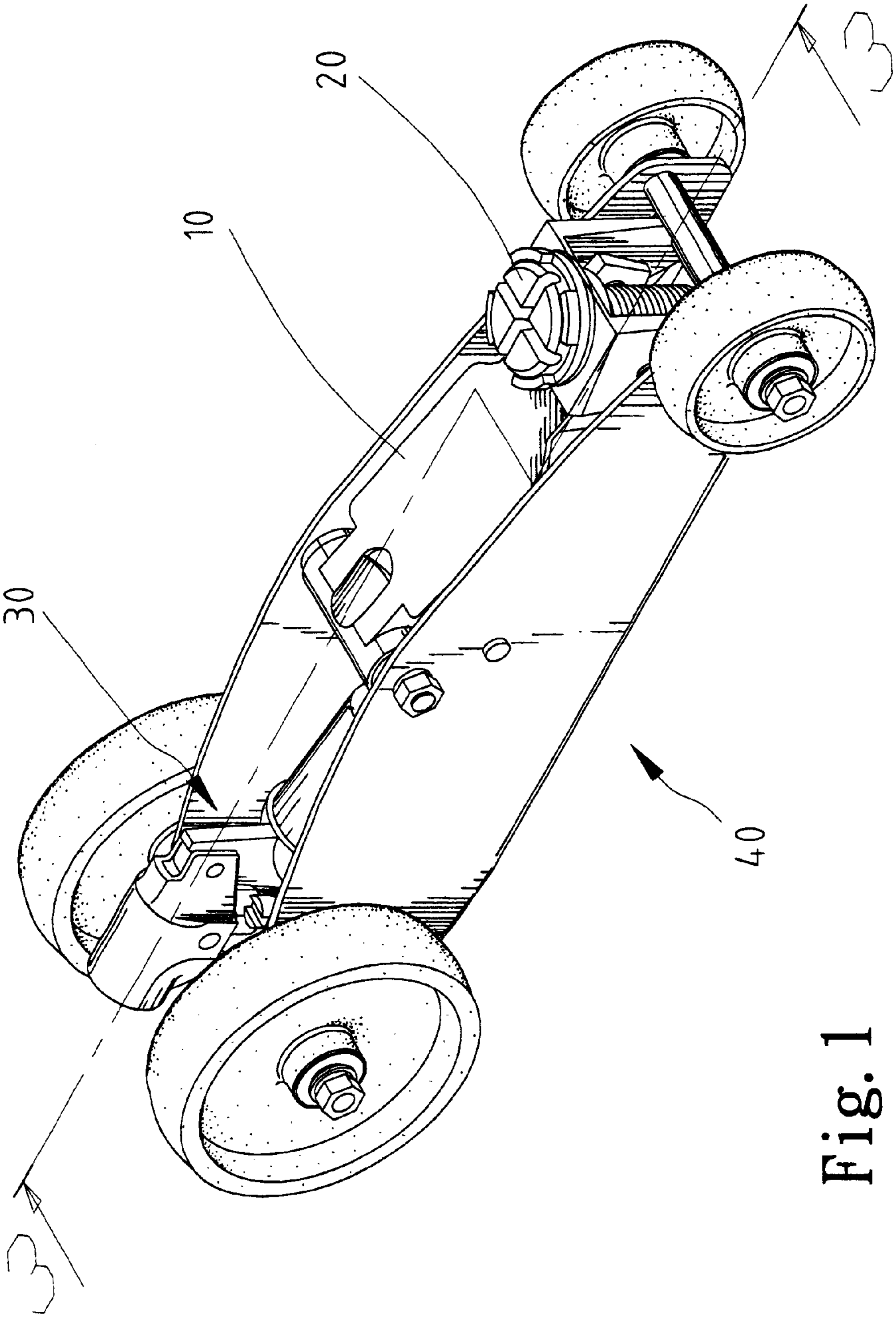
FIG. 1 is a perspective view of a jack in accordance with the present invention.
Figure 2:
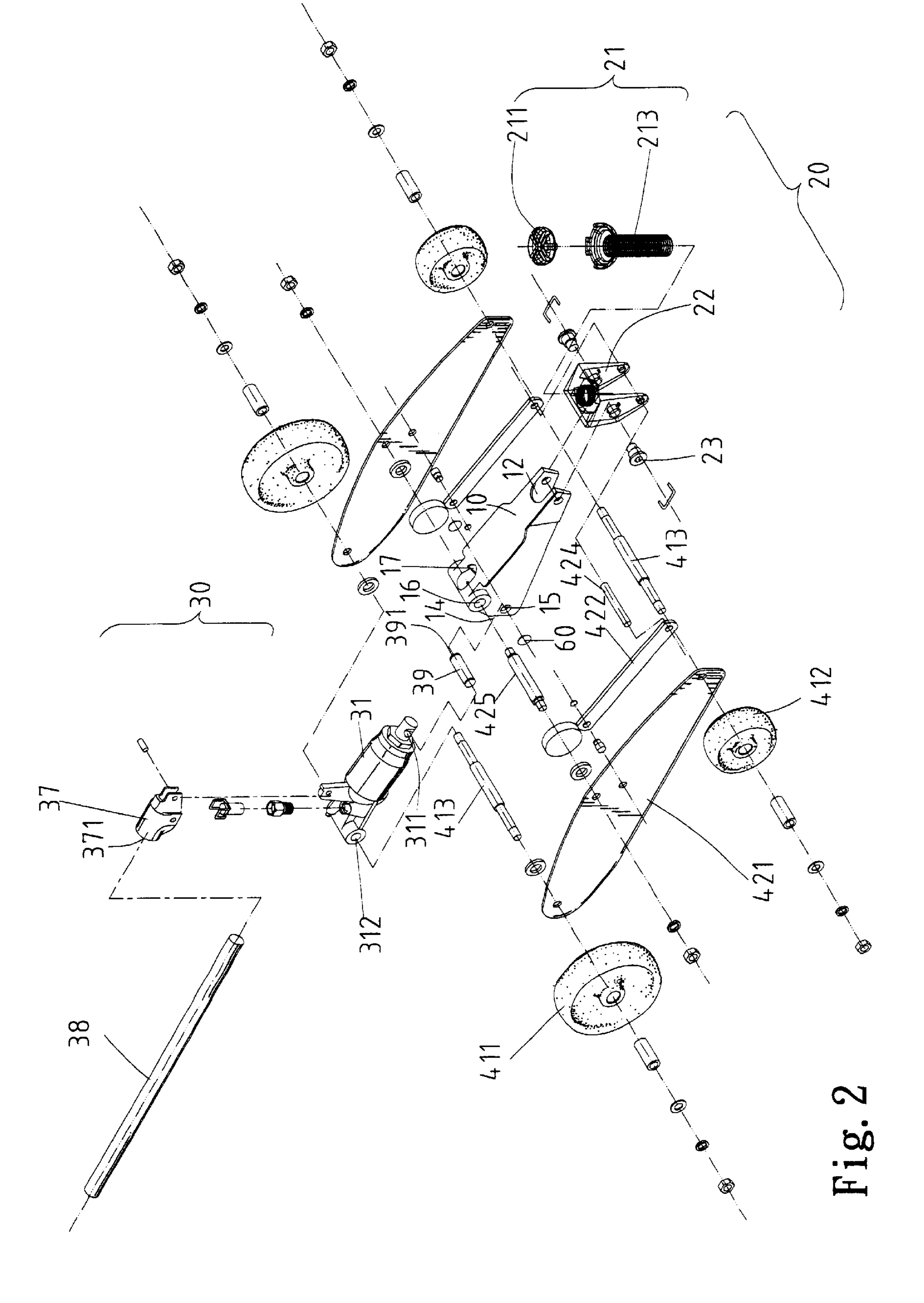
FIG. 2 is an exploded perspective view of the jack in accordance with the present invention.

Referring to FIGS. 1 and 2, a jack in accordance with the present invention generally comprises a frame 40, a base 10, a cylinder means 30, and an elevating means 20, and an operative rod 38. The frame 40 includes a pair of spaced walls or plates 421 having a front axle 413 and a rear axle 413 mounted to front and rear ends thereof, respectively. Two front wheels 412 are rotatably mounted to the front axle 413 and two rear wheels 411 are rotatably mounted to the rear axle 413 for providing the jack with maneuverability.

The base 10 includes a first end 16 pivotally between intermediate portions of the plates 421 of the frame 40 by a pin 425 and a second end 12 to which the elevating means 20 is securely attached. The elevating means 20 includes a seat 22 secured to the second end 12 of the base 10 by members 23 and an elevating member 21 securely mounted to the seat 22. Thus, the elevating member 21 and the second end 12 of the base 10 are located between first ends of the plates 421 of the frame 40. The elevating member 21 includes a support head 211 and a support member 213, which are conventional and therefore not described in detail. Of more importance, the base 10 includes an engaging hole 17 in a top thereof and adjacent to the first end 16.

A pair of links 422 are mounted between the plates 421 and each have a first end connected with the seat 22 of the elevating means 20 by a common pin 424. Each link 422 further has a second end that is pivotally connected to an associated plate 421.

The cylinder means 30 includes a container 31 that receives a cylinder 32 therein. The cylinder 32 includes a bore (not labeled) therein and a piston rod 323 includes a first end slidably received in the bore of the cylinder 32 and a second end 311 beyond the cylinder 32 and container 31. The second end 311 of the piston rod 323 is connected to the base 10 at 15 to move therewith. In this embodiment, a pin 39 is extended through the second end 311 of the piston rod 323 with each of two ends of the pin 39 extending through an associated hole 15 in a side wall of the base 10, and a C-clip 60 is engaged in an annular groove 391 in each end of the pin 39. The container 31 includes an extension (not labeled) with a-transverse hole 312 through which the rear axle 413 extends. Namely, the cylinder means 30 is pivotally mounted between the second ends of the plates 421 of the frame 40. The cylinder means 30 is of a conventional structure and therefore will not be described in detail.

Figure 3:
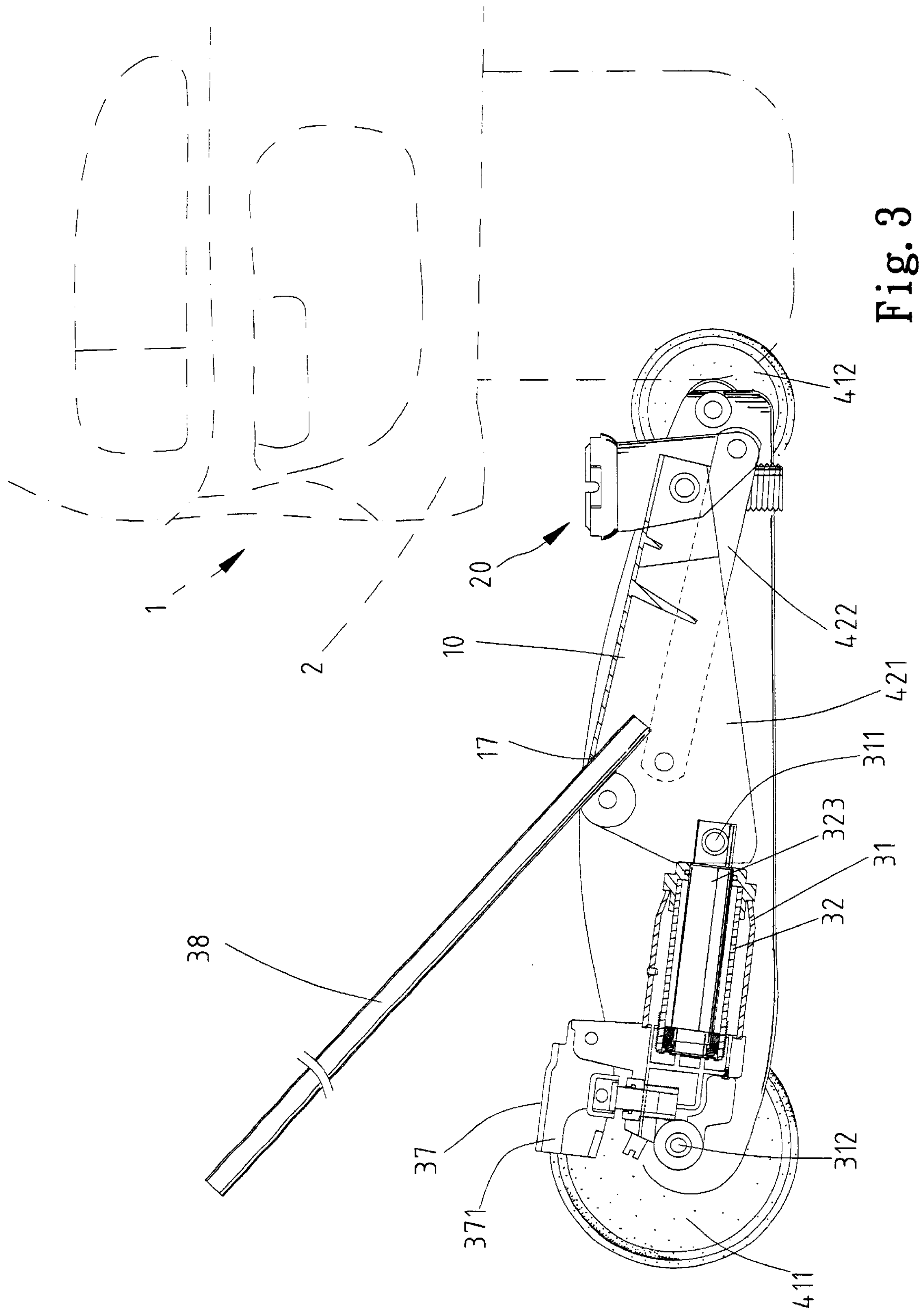
FIG. 3 is a sectional view taken along plane 3—3 in FIG. 1.
Figure 4:
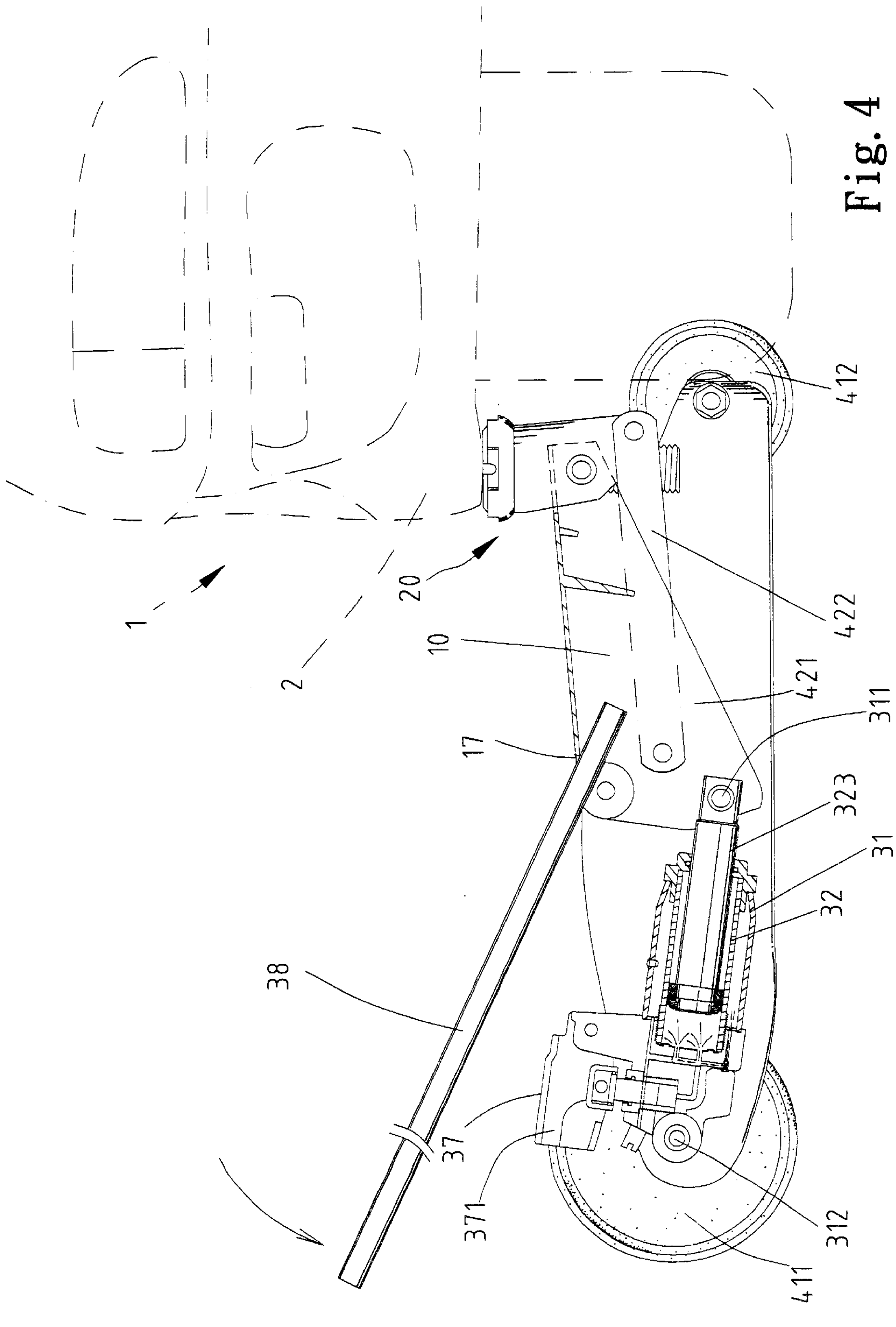
FIG. 4 is a sectional view similar to FIG. 3, wherein an elevating member of the jack is moved upward to abut an underside of a car chassis.

When a user intends to use the jack to lift a chassis 2 of a car 1, the jack is moved to a position shown in FIG. 3, and an end of the operative rod 38 is engaged with the engaging hole 17 of the base 10. Referring to FIG. 4, when the user applies a downward force to the other end of the operative rod 38, the second end 12 of the base 10 pivots upward. As a result, the second end 311 of the piston rod 323 is moved outward quickly and working fluid (not labeled) flows into the cylinder 32 quickly, while the elevating means 20 is quickly moved to a position for supporting the chassis 2 for the car 1, best shown in FIG. 4.

Figure 5:
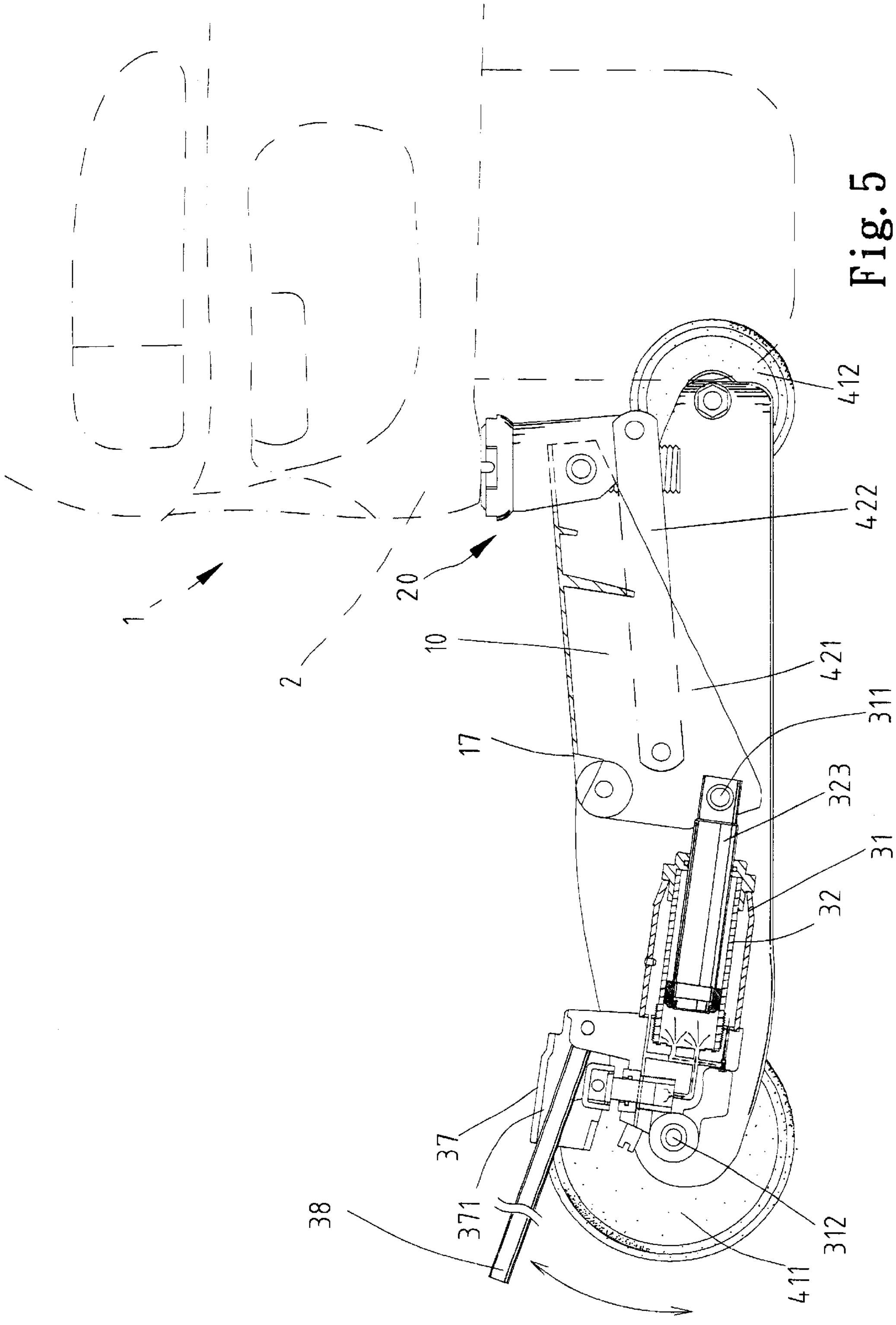
FIG. 5 is a sectional view similar to FIG. 4, wherein an operative rod is engaged with a cylinder means.
Figure 6:
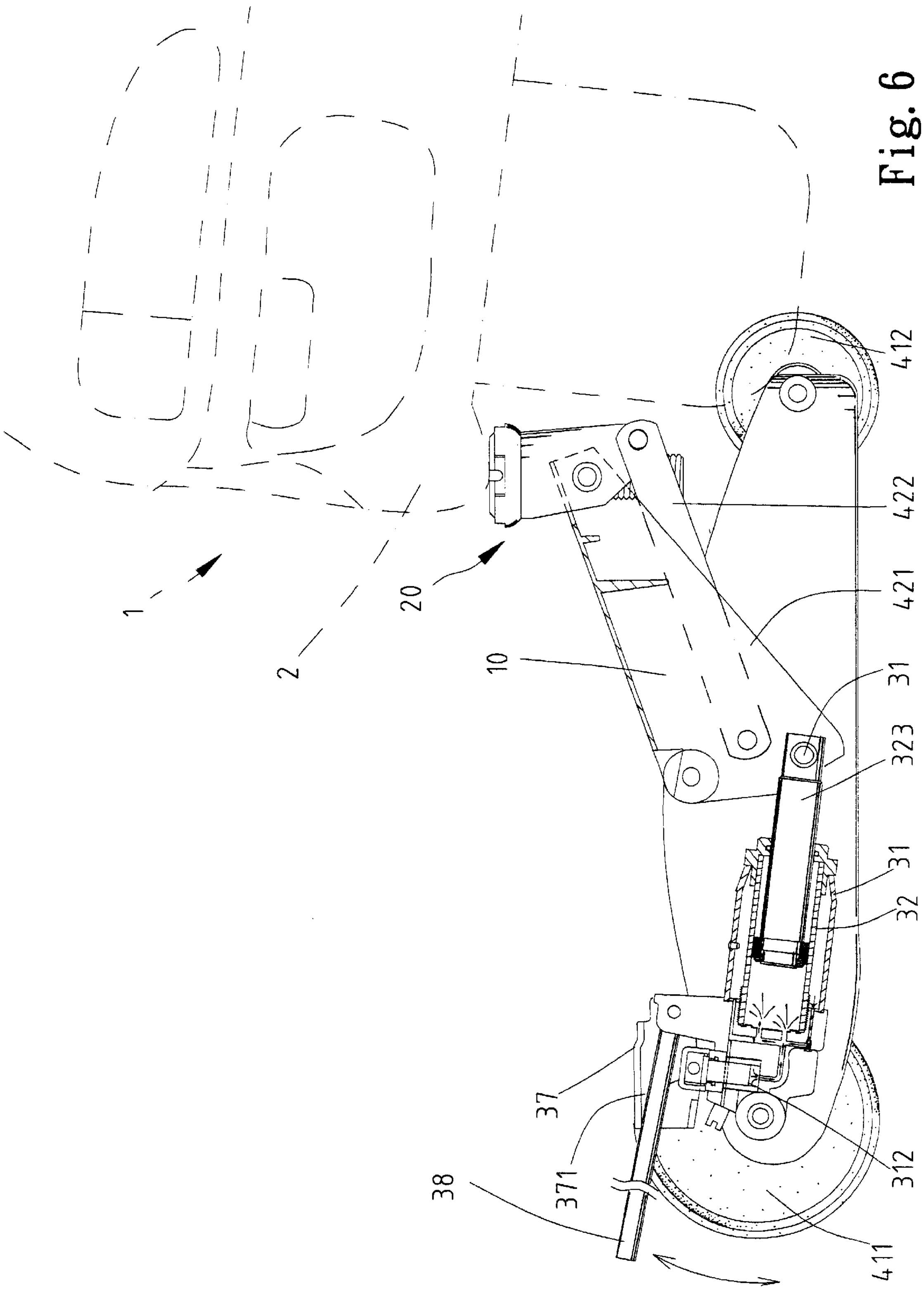
FIG. 6 is a sectional view similar to FIG. 5, wherein the operative rod is pivoted to operate the cylinder means.

Next, the operative rod 38 is removed from the base 10 and then engages with an engaging hole 371 of a pumping member 37 of the cylinder means 30. Thus, the user may pivot the operative rod 39 up and down for moving the second end 311 of the piston rod 323 out of the cylinder 32, which causes upward movement of the elevating means 20, thereby lifting the chassis 2 of the car 1, best shown in FIGS. 5 and 6. It is appreciated that structure and operation of the cylinder means 30 are conventional and therefore will not be described in detail. The lowering of the chassis 2 of the car 1 by releasing the working oil in the cylinder 32 is also conventional and therefore not described in detail.

According to the above description, it is appreciated that the jack in accordance with the present invention may quickly move the elevating means of the jack to a position abutting an underside of the object to be elevated.

Although the invention has been explained in relation to its preferred embodiment, it is to be understood that many other possible modifications and variations can be made without departing from the spirit and scope of the invention as hereinafter claimed.

What is claimed is:

1. A jack comprising:

a frame;

a base including a first end pivotally mounted to the frame and a second end, the base further including an engaging portion;

an elevating member securely attached to the second end of the base;

a cylinder means including an end pivotally connected to the frame, the cylinder means including a cylinder and a piston rod having a first end slidably received in the cylinder and a second end beyond the cylinder, the second end of the piston rod being connected to the base to move therewith; and an operative rod releasably engageable with one of the engaging portion of the base and the cylinder means;

wherein when an end of the operative rod is engaged with the engaging portion of the base, the elevating member is quickly elevated when another end of the operative rod is applied with a force; and wherein when the operative rod is engaged with the cylinder means, the elevating member is elevated under manual operation on the operative rod.

2. A jack comprising:

a frame including a pair of spaced plates each having a first end, a second end, and an intermediate portion;

a base including a first end pivotally mounted between the intermediate portions of the plates of the frame and a second end located between the first ends of the plates, the base further including an engaging portion;

an elevating member securely attached to the second end of the base;

a cylinder means including an end pivotally connected between the second ends of the plates of the frame, the cylinder means including a cylinder and a piston rod having a first end slidably received in the cylinder and a second end beyond the cylinder, the second end of the piston rod being connected to the base to move therewith; and an operative rod releasably engageable with one of the engaging portion of the base and the cylinder means;

wherein when an end of the operative rod is engaged with the engaging portion of the base, the elevating member is quickly elevated when another end of the operative rod is applied with a force; and wherein when the operative rod is engaged with the cylinder means, the elevating member is elevated under manual operation on the operative rod.

3. The jack as claimed in claim 2, further comprising a pair of links mounted between the plates, each said link having a first end connected with the elevating member and a second end that is pivotally connected to an associated said plate of the frame.

* * * * *